United States Patent
Kent et al.

(10) Patent No.: US 9,152,278 B2
(45) Date of Patent: Oct. 6, 2015

(54) BACKGROUND CAPACITANCE COMPENSATION FOR A CAPACITIVE TOUCH INPUT DEVICE

(75) Inventors: Joel C. Kent, Fremont, CA (US); Selina Li, Sunnyvale, CA (US); Jong Yi, Hamilton, NJ (US)

(73) Assignee: Elo Touch Solutions, Inc., Milpitas, CA (US)

( * ) Notice: Subject to any disclaimer, the term of this patent is extended or adjusted under 35 U.S.C. 154(b) by 105 days.

(21) Appl. No.: 13/013,613

(22) Filed: Jan. 25, 2011

(65) Prior Publication Data

US 2012/0162123 A1 Jun. 28, 2012

Related U.S. Application Data (60) Provisional application No. 61/426,421, filed on Dec. 22, 2010, provisional application No. 61/426,344, filed on Dec. 22, 2010.

(51) Int. Cl.
  *G06F 3/045* (2006.01)
  *G06F 3/041* (2006.01)
  *G06F 3/044* (2006.01)

(52) U.S. Cl.
  CPC .............. *G06F 3/044* (2013.01); *G06F 3/0418* (2013.01)

(58) Field of Classification Search
  CPC ................................ G06F 3/044; G06F 3/0418
  USPC .................................................. 345/173–174
  See application file for complete search history.

(56) References Cited

U.S. PATENT DOCUMENTS

| | | | |
|---|---|---|---|
| 5,327,164 A | 7/1994 | Fagard et al. | |
| 5,861,583 A * | 1/1999 | Schediwy et al. | 178/18.06 |
| 5,877,458 A * | 3/1999 | Flowers | 178/18.01 |
| 6,297,811 B1 | 10/2001 | Kent et al. | |
| 7,567,240 B2 | 7/2009 | Peterson, Jr. et al. | |
| 2004/0104826 A1 * | 6/2004 | Philipp | 341/34 |
| 2006/0267953 A1 * | 11/2006 | Peterson et al. | 345/173 |
| 2006/0279548 A1 | 12/2006 | Geaghan | |
| 2007/0052690 A1 | 3/2007 | Roberts | |
| 2008/0041642 A1 | 2/2008 | Trent et al. | |

(Continued)

FOREIGN PATENT DOCUMENTS

WO    WO 96/15464    5/1996

OTHER PUBLICATIONS

International Search Report & Written Opinion for PCT/US2011/066026 mailed Mar. 14, 2012.

(Continued)

*Primary Examiner* — Temesgh Ghebretinsae
*Assistant Examiner* — Kwin Xie
(74) *Attorney, Agent, or Firm* — Alston & Bird LLP (57) ABSTRACT

A location of contact with a touch sensitive device is determined. Values associated with each electrode of a plurality of electrodes formed on a single layer of the touch sensitive device are sampled. A determination is made as to whether a contact with the touch sensitive device has occurred. Values sampled subsequent to the contact are adjusted based on selected stored sampled values. A location of contact is then determined based on the adjusted values.

20 Claims, 8 Drawing Sheets

(56) References Cited

U.S. PATENT DOCUMENTS

| | | |
|---|---|---|
| 2008/0158169 A1* | 7/2008 | O'Connor et al. ............ 345/173 |
| 2009/0095540 A1 | 4/2009 | Zachat et al. |
| 2009/0127003 A1 | 5/2009 | Geaghan |
| 2010/0060609 A1 | 3/2010 | Doi et al. |
| 2010/0214232 A1 | 8/2010 | Chan et al. |
| 2010/0295813 A1 | 11/2010 | Kent |
| 2010/0295814 A1 | 11/2010 | Kent et al. |
| 2011/0210941 A1* | 9/2011 | Reynolds et al. ............ 345/174 |
| 2011/0241907 A1* | 10/2011 | Cordeiro ..................... 341/20 |
| 2011/0279169 A1 | 11/2011 | Salaverry |
| 2011/0279409 A1 | 11/2011 | Salaverry et al. |
| 2012/0098783 A1 | 4/2012 | Badaye et al. |
| 2012/0162094 A1 | 6/2012 | Kent et al. |

OTHER PUBLICATIONS

United States Office Action for U.S. Appl. No. 13/013,596, dated Jul. 17, 2013.

International Search Report and Written Opinion from corresponding International Application No. PCT/US2011/066032, mailed Mar. 6, 2012.

International Preliminary Report on Patentability from corresponding International Application No. PCT/US2011/066032, dated Jun. 25, 2013.

Final Office Action from U.S. Appl. No. 13/013,596, mailed Dec. 4, 2013.

* cited by examiner

BACKGROUND CAPACITANCE COMPENSATION FOR A CAPACITIVE TOUCH INPUT DEVICE

CROSS-REFERENCE TO RELATED APPLICATIONS

This application claims priority from commonly-owned U.S. provisional patent application Nos. 61/426,421 and 61/426,344 filed on Dec. 22, 2010.

BACKGROUND

Capacitive touch input devices are utilized in a variety of applications. For example, transparent capacitive touch input devices placed in front of displays may be utilized with computers or portable devices to enable user interaction with displayed objects. Opaque capacitive touch input devices are used for track pads and other applications not requiring programmable displayed images behind the touch surface.

Capacitive touch input devices may include a touch sensitive electrode layer that enables determination of a point of contact such as over a display, at the location where a user touches the touch sensitive layer over the display. A group of sensing electrodes enable determining the X and Y location of the point of contact. The electrodes may be coupled to capacitance sensing circuitry including analog-to-digital converters that measure values associated with the electrodes, such as the capacitance, current, charge, impedance or voltage associated with the electrodes.

Many capacitive touch input devices use at least two electrode layers to measure two coordinates, e.g. (X,Y), of a touch location. For example, parallel sensing electrodes aligned along the X-axis formed on a first layer and parallel sensing electrodes aligned along the Y-axis formed on a different or second layer such that the electrodes on the first layer are formed orthogonally with respect to the electrodes on the second layer and form an overlapping matrix of addressable points of the touch sensor. Such two layer capacitive touch input devices provide good touch performance for many applications, but at increased manufacturing costs.

For some applications, a touch input device with a single electrode layer may provide adequate touch performance at a lower cost. However, single electrode layer touch devices tend to be more susceptible to certain sources of background interference as compared to two-electrode-layer capacitive input devices.

Mechanical deflection of the touch device is a source of background interference. For example, touch induced pressure against the device may cause mechanical deflection between sensing electrodes and an underlying ground plane.

Stray capacitance between the sensing electrodes and the palm of the hand or other body parts of the user is another source of background interference. This background is particularly problematic if there is a thick dielectric layer between the electrodes and touch surface. Doubling the dielectric layer thickness will halve the desired finger touch signal, but will have little effect on backgrounds due to palms and other body parts (because air gap has strong effect on background capacitance than dielectric layer thickness). Hence, the ratio of undesired palm background signal, relative to the desired finger touch signal, increases as the thickness of the dielectric layer between electrodes and the touch surface increases. Such background signals from stray capacitances from the palm and other body parts can distort measured touch coordinate positions, particularly in single layer electrode designs.

BRIEF SUMMARY

Methods, system, and computer readable media are provided for determining a location of contact with a touch sensitive device. An amount of background capacitance is determined prior to contact being made with a touch display. The background capacitance amount is then removed from measurements made after contact is established.

In a first aspect, the method may include sampling a value associated with each electrode of a plurality of electrodes of the touch sensitive device, the touch sensitive device comprising a single electrode layer device. At least some of the sampled values are stored. A determination is made as to whether a contact with the touch sensitive device has occurred. Values sampled after contact has been determined are then adjusted based on the stored sample values. A location of contact is then determined based on the adjusted values.

In a second aspect, a system is provided for determining a location of contact with a touch sensitive device. The system includes one or more analog-to-digital converters (ADCs) configured to sample signals at a plurality of electrodes. A processor is configured to store values for at least some of the sampled signals. The processor then determines whether a contact with the touch sensitive device has occurred and selects a background value for each of the electrodes of the plurality from the stored values. The processor adjusts the values or subsequent values for each of the electrodes based on the respective background values and determines a location of contact based on the adjusted values.

In a third aspect, a non-transitory computer readable storage medium is provided. The storage medium includes instructions for sampling a value associated with each electrode of a plurality of electrodes, storing at least some of the sampled values, determining whether a contact with the touch sensitive device has occurred, adjusting values sampled subsequent to the contact based on the stored sample values, and determining a location of contact based on the adjusted values.

The present invention is defined by the following claims, and nothing in this section should be taken as a limitation on those claims. Further aspects and advantages of the invention are discussed below in conjunction with the preferred embodiments.

BRIEF DESCRIPTION OF THE DRAWINGS

The accompanying drawings are included to provide a further understanding of the claims, are incorporated in, and constitute a part of this specification. The detailed description and illustrated embodiments described serve to explain the principles defined by the claims.

DETAILED DESCRIPTION OF SPECIFIC EMBODIMENTS OF THE INVENTION

The embodiments below describe systems and methods that combine spatial and temporal information associated with a contact of a touch sensitive device to distinguish between capacitance variations associated with a user's palm, which are relatively slowly varying and spatially spread out, from more rapidly varying and spatially concentrated finger touch signals. In particular, at the moment when the channel with the strongest finger touch signal starts its rapid rise, which occurs as the last millimeter of air gap between the finger and touch surface disappears, the background capacitance may already be close to reaching a steady state value. The systems and methods will take into account other types of background capacitance present, such as the device-holding hand background.

Figure 1A:
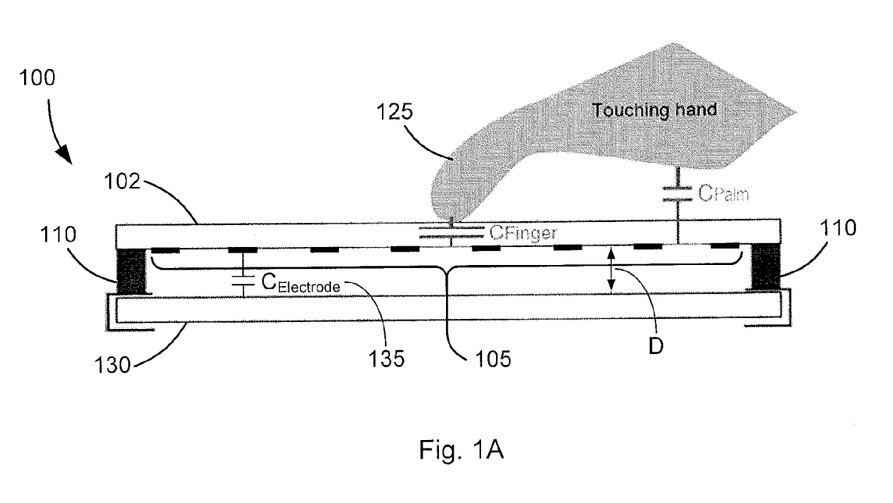
FIG. 1A illustrates an exemplary side view of a capacitive touch sensitive device.

FIG. 1A illustrates an exemplary side view of a capacitive touch sensitive device 100. The touch sensitive device 100 includes a contact layer 102 and a ground plane 130. The contact layer 102 and ground plane 130 are separated by a distance D by a support structure 110. The distance D may be uniform or vary. In some instances, the distance may vary as a function of applied contact pressure. Concurrently filed U.S. application Ser. No. 13/013,596, which is hereby incorporated by reference, discloses methods and systems for compensating for such variations. Additional, different, or fewer components may be provided. For example, additional support structures 110 may be provided.

The ground plane 130 may correspond to a conductive material. In a specific embodiment such as where device 100 is a touchscreen, a transparent conductive ground plane 130 such as indium tin oxide (ITO) may be used. In some implementations, the ground plane 130 is formed as part of a display (not shown), such as a liquid crystal display, light emitting diode (LED) display, or a different type of display. In other embodiments such as where device 100 is a touch pad, the ground plane 130 may be any opaque conductive metal layer.

The contact layer 102 may be transparent or partially transparent or opaque. The contact layer 102 may be glass, a plastic material, or a different transparent or opaque material having at least one conductive electrode layer, as described below.

A group of electrodes 105, (e.g., 8 electrodes) for determining a contact location may be positioned on a lower surface of the contact layer 102. The number of electrodes 105 may be increased or decreased to change the resolution of the determined contact location. The electrodes 105 may correspond to a single layer of transparent conductive electrodes that extend in a Y-axis direction from one side of the contact layer 102 to an opposite side along the plane such that electrodes 105 do not overlap. In a specific embodiment, the single layer may be the only electrode layer, without other layers of sensing electrodes and/or without overlapping electrodes within the plane of the contact layer 102. However, in alternative embodiments, the electrodes 105 may be on one layer as part of a multi-layer (e.g., two-layer) electrode pattern in which an orthogonal set of electrodes is in another plane.

The electrodes 105 are deposited, bonded, or otherwise formed on the contact layer 102. The electrodes 105 may be made of a material, such as ITO (indium tin oxide), thin metallic films, carbon nanotubes, silver nanowires and intrinsically conductive polymers, which may be transparent. For opaque applications electrodes 105 may be of any conducting material including copper, other metals, and conductive composite polymers containing carbon or metal particles.

Each electrode 105 may interact with the ground plane 130 to form a capacitor 135. The value of the capacitor may be directly related (e.g., inversely proportional) to the air-gap distance D between the contact layer 102 and the ground plane 130. The capacitance value is also affected by the presence of an object such as a user's finger 125, which enables the determination of a point at which a user's finger 125 contacts the touch sensitive device, or more precisely where the user's finger 125 contacts the contact layer 102. As described in more detail below, the capacitance value is also affected by other objects, such as the user's palm or other fingers wrapped around or near the touch sensitive device 100.

The electrodes 105 may be parallel to one another and may be evenly distributed across the lower surface of the contact layer 102. Other spacing, non-parallel alignment, extents and/or or patterns may be used in other embodiments.

Figure 1B:
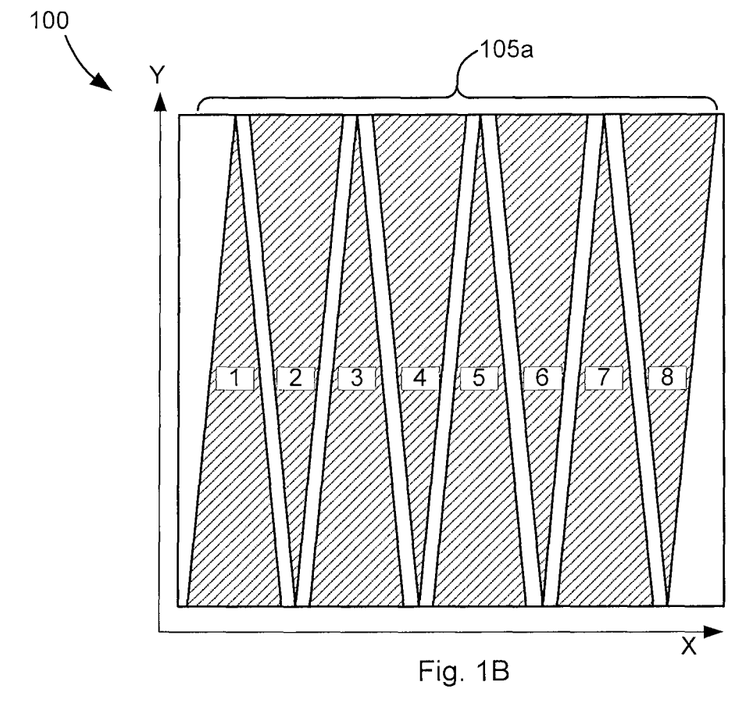
FIG. 1B illustrates a top view of a first exemplary sensing electrode pattern of the capacitive touch sensitive device.
Figure 1C:
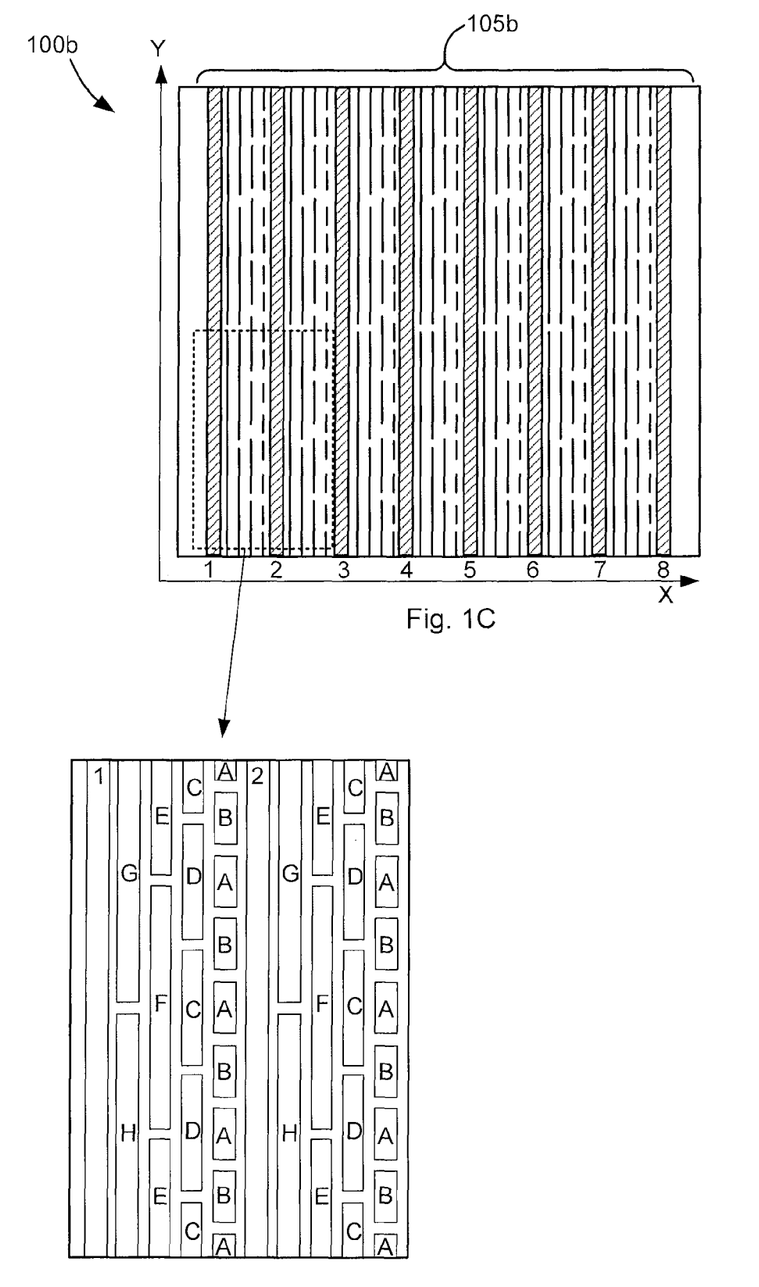
FIG. 1C illustrates a top view of a second exemplary sensing electrode pattern of the capacitive touch sensitive device.

FIGS. 1B and 1C illustrate respective top views of different exemplary sensing electrode patterns that may be utilized with the capacitive touch sensitive device 100, according to specific embodiments. Referring to FIG. 1B, the electrodes 105a may be generally triangular shaped and may be arranged in an alternating configuration, such as the so-called "backgammon" electrode pattern such as disclosed in U.S. Pat. No. 6,297,811 or in U.S. published patent applications 20100295814 or 20100295813, which are hereby incorporated by reference. This type of electrode pattern provides coordinate sensing electrodes on a single layer. The vertical coordinate of a contact location may be determined by the fraction of the touch signal measured at the odd numbered triangular electrodes (e.g., 1, 3, 5, and 7) while the horizontal coordinate of the contact location is determined by the distribution of the touch signal as a function of electrode number, for example by a mean, median or maximum of the distribution. For good touch performance, it is desirable that the triangular electrodes be sufficient narrow and numerous so that a typical finger touch contact area overlaps several different electrodes. FIG. 1B is a conceptual illustration in which the width of the electrodes is exaggerated and the number of electrodes is much smaller than more typical numbers in the 50 to 200 range. In some applications it may be desirable to limit the number of electronic channels for cost reasons, in which case systems can be designed so that more than one electrode is electrically connected to each electronic channel, for example electrodes 3, 5 and 7 could be connected to one electronic channel and electrodes 6 and 8 to the next electronic channel.

Referring to FIG. 1C, the electrodes 105b may be arranged in a so-called "binary" pattern such as described in U.S. patent application Ser. No. 12/780,077, which is hereby incorporated by reference. Each numbered and lettered segment corresponds to an electrode 105b. Electrodes or segments 105b with the same number or letter may be electrically connected together for an electronic channel either via small interconnect traces (not shown) within the pattern or via interconnections in associated cabling or printed circuit boards (not shown). The horizontal coordinate of the contact location is determined via those electrodes 105b that extend the full height of the touch area (electrodes 1, 2, . . . , 8). The vertical coordinate is determined via the lettered electrodes (A, B, . . . , H). The vertical coordinate may be represented by a binary code, such as a 4-bit binary code for a specific embodiment, where each bit of the code is associated with a given column of vertical coordinate electrodes 105b and the value of each bit indicates which of the two vertical coordinate electrodes in a given column has the strongest capacitance measurement signal. For example, the 0 value of the least significant bit of the pattern 0010 may indicate that the electrode measurement associated with electrode B is smaller than electrode A. The value 1 of the second lowest order bit may indicate that the electrode measurement associated with electrode D is larger than electrode C. The value of the second highest order bit and the most significant bit may indicate the relative measurements for electrodes E and F, and for electrodes G and H, respectively. Additional bits of vertical coordinate information can be provided by having additional columns of more finely segmented electrodes.

Figure 2:
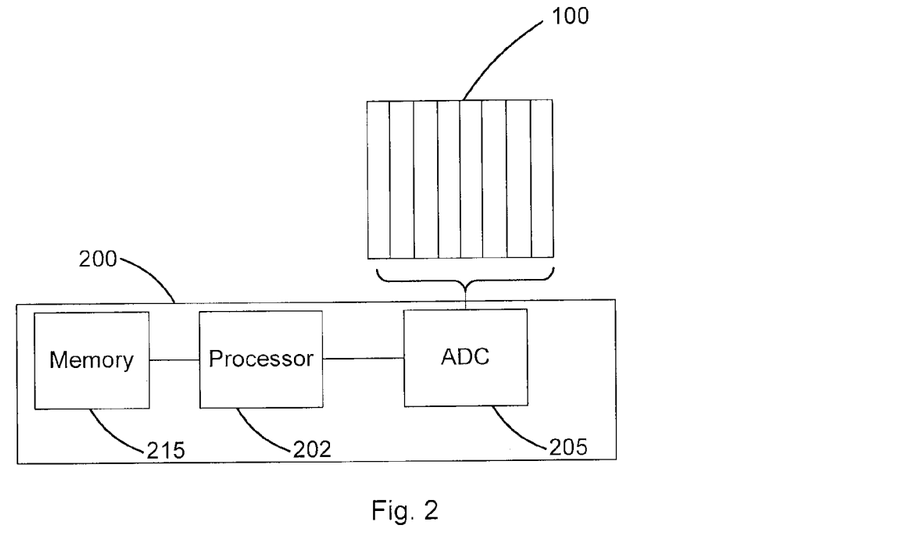
FIG. 2 illustrates an exemplary system that may be utilized to determine a contact location.

FIG. 2 illustrates an exemplary system 200 that may be utilized to determine the contact location. The system 200 includes a processor 202, a memory 215, and an analog-to-digital converter 205 (ADC). The ADC 205 and associated analog electronics may be utilized to measure capacitance values associated with the electrodes 105 and any other sensing electrodes in the capacitive input device. For example, the electrodes 105 may be coupled to the ADC 205. The ADC 205 may have a resolution of 8, 16, or 32 bits, according to specific embodiments. The resolution of the ADC 205 may be different and may be suited to a particular need. A multiplexer or other switching device allows the ADC 205 to measure separately at each electrode along the respective axis. Alternatively, one ADC measures a first group of electrodes and a different ADC is provided for measuring a different group of electrodes.

The processor 202 is in communication with the ADC 205 and is configured to analyze the capacitance values measured by the ADC 205 to determine a contact location of the contact layer 102. The processor 202 may correspond to an ARM®, Intel®, AMD®, PowerPC® processor, or a different processor. The processor 202 may include or be in communication with the memory 215. The memory 215 may be a random-access memory, read-only memory, programmable memory, or a different type of non-transitory memory. The memory 215 may store instruction code to be executed by the processor for carrying out operations including any operations described herein. The instruction code configures the processor 202 for operation by being provided in the memory prior to use and/or by being loaded into the processor 202 during operation. The memory 215 may also store various parameters utilized in determining a contact location of the contact layer 102. Other information may be stored in the memory 215. The respective components 202, 205, and 215 may all be contained in a single chip, or each could be a separate electronic component, or a combination thereof.

Figure 3:
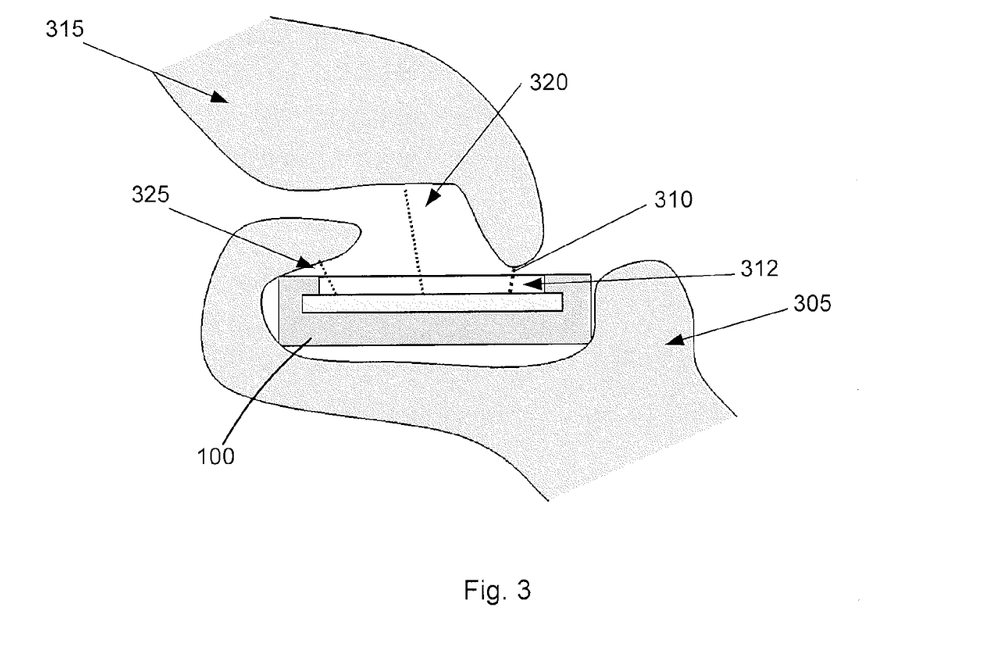
FIG. 3 illustrates an exemplary manner in which a user interacts with the touch sensitive device.

FIG. 3 illustrates an exemplary manner in which a user interacts with the touch sensitive device 100. Shown in FIG. 3 are the user's first and second hand 305 and 315, and the touch sensitive device 100. The first hand 305 is holding the touch sensitive device 100 and a finger of the second hand 315 is contacting the touch sensitive device 100 at a contact location 310. As noted above, objects within the vicinity of the touch sensitive device 100 may affect the capacitance measured at the respective sensing electrodes 105. The finger in contact with the touch sensitive device 100 produces a desired capacitive effect 312. The palm of the second hand 315 produces an undesired capacitive effect 320. The fingers of the first hand 305 also produce an undesired capacitive effect 325. Additional undesired capacitive effects may be produced by other nearby conductive objects. The respective undesired capacitive effects are collectively referred to as the "background capacitance." The background capacitance may vary depending on the distance of the object causing the background capacitance from the touch sensitive device 100 and other factors, such as the object's size and consistency. Background capacitance may result when using non-hand held devices as well, such as a personal computer touch screen or a laptop computer touch pad.

Figure 4A:
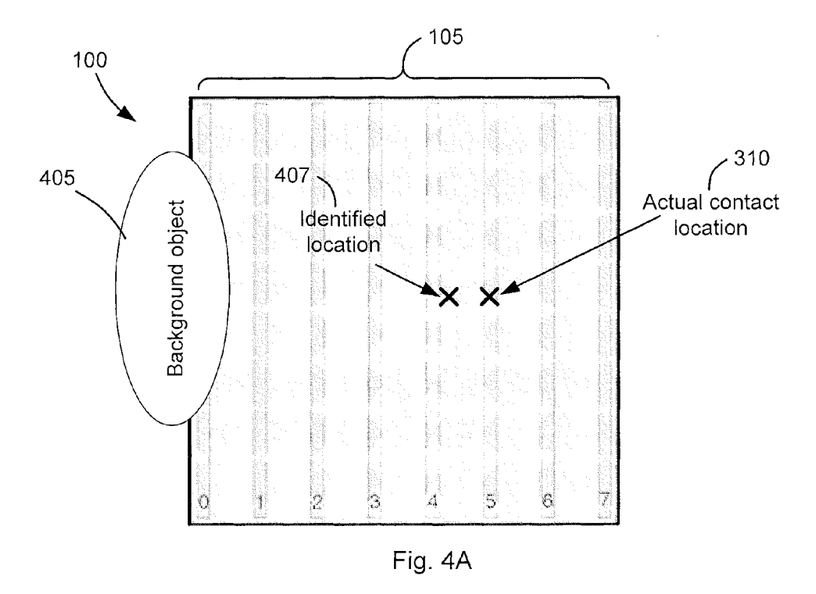
FIG. 4A illustrates the positional relationship between an actual contact location, a background object that produces background capacitance, and electrodes of the contact layer.

FIG. 4A illustrates the positional relationship between the actual contact location 310, a background object 405 that produces background capacitance, and the electrodes 105 of the contact layer 102. As shown, the actual contact location 310 is in the vicinity of electrode 5. An example background object 405 is near an edge of the contact layer 102 and may correspond to a user's palm, fingers, and/or any other undesired objects near the contact layer 102. Other relative locations and/or quantity of background objects 405 may be provided. If uncorrected, the signal background from background object 405 results in a distorted identified location 407 that is offset from the actual contact location 310.

Figure 4B:
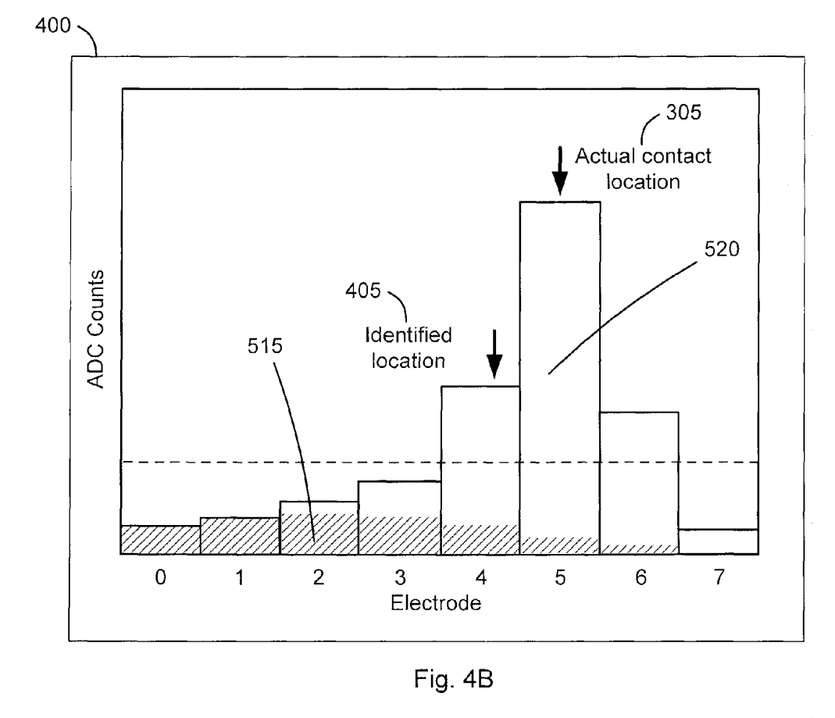
FIG. 4B is an exemplary chart that illustrates measurements associated with a capacitance at each of the electrodes seen in FIG. 4A.

FIG. 4B is an exemplary chart 400 that illustrates measurements associated with the capacitance at each of the electrodes 105 in FIG. 4A. The electrodes 105 are represented along the X-axis of the chart 400. For example, electrode 0 represents the left-most electrode of the contact layer 102. Electrode 7 represents the right-most electrode of the contact layer 102. The Y-axis represents the magnitude of the measurement taken for a given electrode 105. The measurements may correspond to ADC readings associated with the capacitance of a given electrode 105.

Referring to the chart 400, the capacitance associated with the contact 310 is represented by the solid portion (e.g., non-hashed portion) of the bars. The background capacitance 515 is represented by the hashed portion of the bars. As noted above, the processor 202 utilizes the readings to determine the contact location. In an ideal situation, where the background capacitance 515 is non-existent, the X component of the contact location can be identified by locating a median of the signal's distribution in X, that is, the point on the X-axis whereby the sum of the measured values above the location and below the location are equal. Other location functions may be used, such as finding a weighted average position of the signal's distribution in X. While FIG. 4A illustrates the case of a simple set of parallel electrodes, the principles are more general.

However, in realistic situations, there will be some background capacitance 515. If left unaccounted for, the background capacitance 515 will skew the results of the contact location identification. For example, a background object 405 positioned left of the actual contact location 310, as illustrated in FIG. 4A, may result in an identified location 407 that is left of the actual contact location 310. This problem may be overcome by considering how the measurements associated with a given electrode change in the time leading up to a contact with the contact layer 102.

Figure 5:
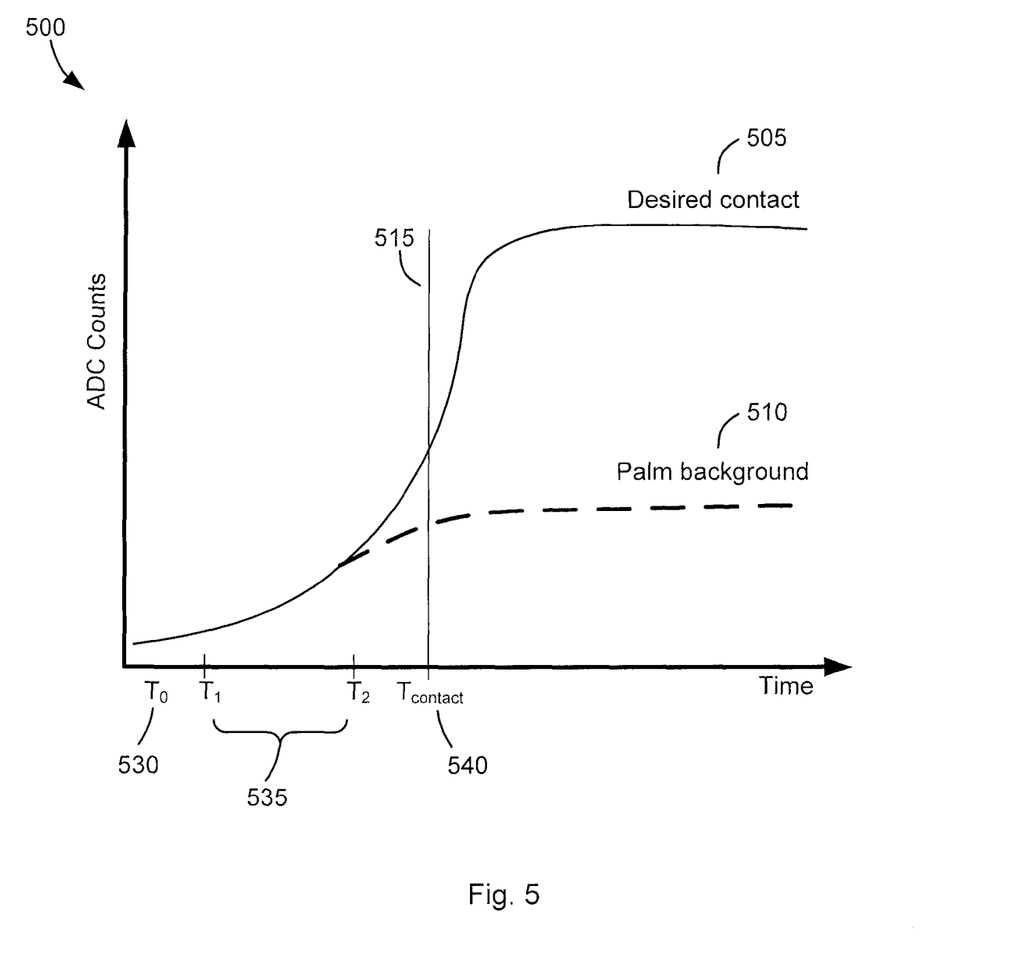
FIG. 5 illustrates measurements associated with a given electrode in the time leading up to a contact.

FIG. 5 illustrates measurements associated with a given electrode in the time leading up to a contact. The solid line 505 represents the measured capacitance value associated with a given electrode for a desired contact. The dashed line 510 represents the background capacitance value associated with the measurement. At an initial time, $T_0$ 530, the measured capacitance is at a relatively low value, which indicates no object is in direct contact with the contact layer 102. However, fingers and/or other objects positioned near the edge of the touch sensitive device 100 may contribute to the measured capacitance at this time.

As an object, such as a user's finger, approaches the contact layer 102, the measured capacitance begins to increase, as shown for the time interval between times $T_1$ and $T_2$ 535. During this interval, the majority of the measured capacitance is associated with the background capacitance. That is, capacitance associated with a background object, such as a user's palm, grasping fingers, etc.

The user's finger begins to contact the contact layer 102 at $T_{Contact}$ 540. At this time, the measurements rise rapidly until a firm contact is established. It can be shown that the rapid increase in measured capacitance is primarily due to the finger contact with the contact layer 102 rather than due to the user's palm. After firm contact is established, the measured capacitance remains substantially constant but may vary. As described below, the behavior of the measurements in the time leading up to a contact enables the determination of an approximate background capacitance for a given electrode.

Figure 6:
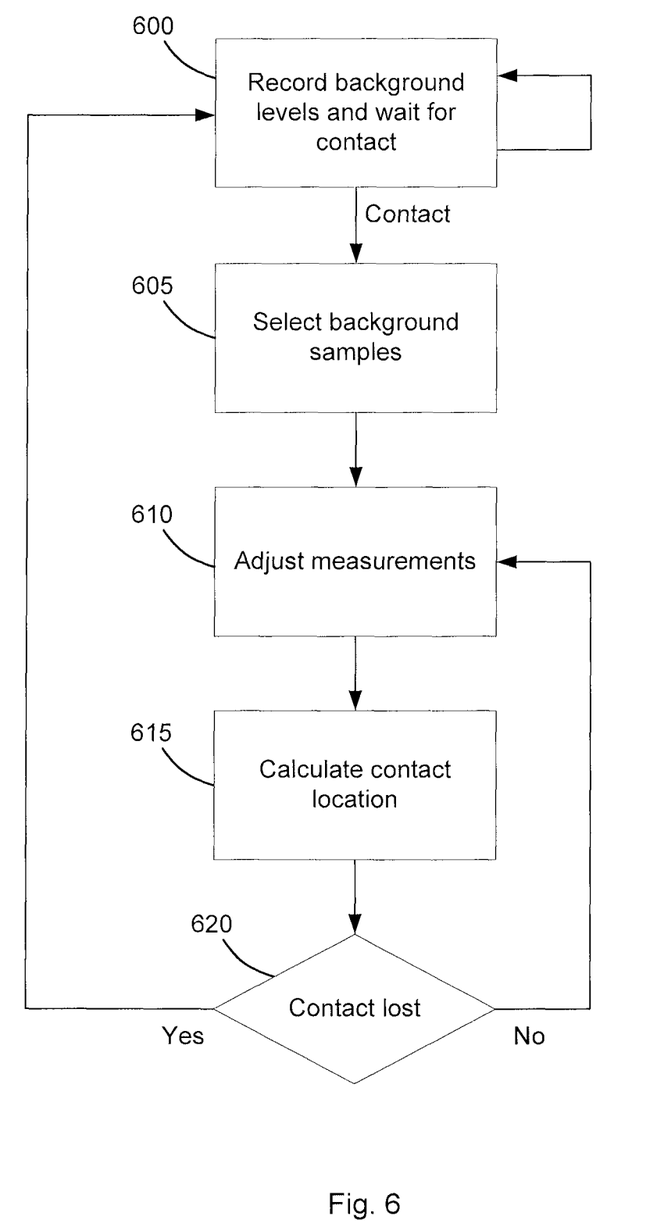
FIG. 6 illustrates exemplary operations that may be utilized to adjust the measured capacitance values to reduce the undesired effects of the background capacitance.

FIG. 6 illustrates exemplary operations that may be utilized to adjust the measured capacitance values to reduce the undesired effects of the background capacitance. The operations are best understood with reference to the chart 700 shown in FIG. 7, which illustrates example measurements associated with a given electrode. Instructions for implementing the operations below with the processor 202 may be stored in a computer-readable medium, such as the memory 215 described above. Alternatively, hardware or both hardware and software are used to implement the operations. Additional, different, or fewer acts may be provided.

At block 600, the contact layer 102 is monitored to detect a contact. For example, the processor 202 may scan or cause the ADCs and/or multiplexors to scan the electrodes 105 of the contact layer 102 at a defined rate such as once every 50 ms. The rate may be increased or decreased to suit a particularly scanning frequency. The processor 202 stores or causes to be stored samples of the measurements associated with the electrodes 105 to a memory for subsequent processing. The memory may correspond to the memory 202 described above or a different memory.

Figure 7:
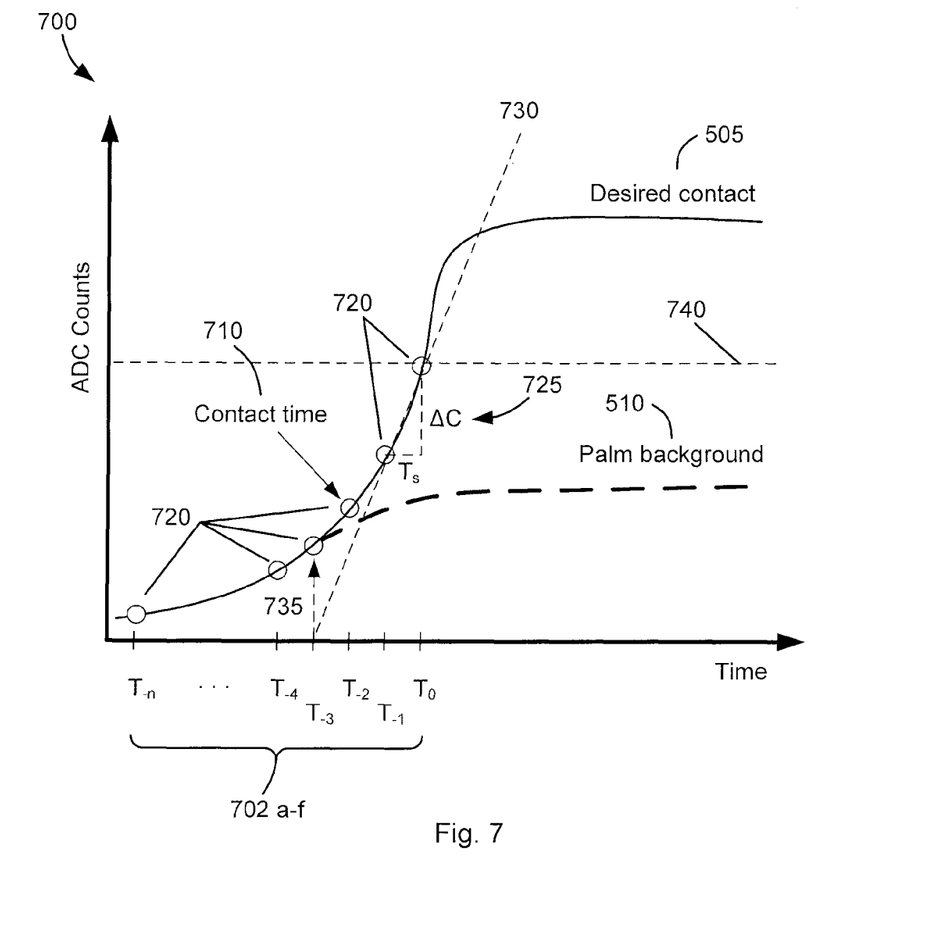
FIG. 7 illustrates sampling of electrode measurements.

Referring to FIG. 7, the samples 720 may be taken on a periodic basis, such as at times $T_{-n}, \ldots T_{-2}, T_{-1}, T_0$ 702a-f. For example, the samples 720 may be taken during each scan of the contact layer 102 described above, every other scan, or at a different frequency. The samples 720 may be taken from all of the electrodes 105 or a subset of the electrodes, such as every other electrode. The processor 202 may determine that contact has occurred when the value associated with a sample 720 for a given electrode exceeds a contact threshold 740. For example, at a given time $T_0$ 702f, a sample for a first electrode may exceed the threshold while samples taken from other electrodes do or do not. The sample taken at time $T_0$ 702f for the first electrode may indicate that contact has occurred.

In some implementations, storing of the samples 720 ceases after contact has been detected. In other implementations, samples 720 are continuously stored. A finite number of samples may be retained in a memory. For example, the last 10 or a different number of samples 720 may be stored. The number of samples 720 stored may be limited by the amount of storage available for storing samples 720, so a first-in first-out approach for storage may be used.

At block 605, for all or a subset of the electrodes 105, a sample 735 stored prior to contact detection, is selected. The selected samples 735 correspond to samples taken across the electrodes at the same time. In other words, all the samples 735 were taken at the same time $T_x$. The value represented by the selected sample 735 for a given electrode may correspond to the background capacitance measured at that electrode. For example, a sample 735 stored 1, 2, 3 or more sample intervals before contact detection may be selected.

In some implementations, determination of a sample 720 to select is based on a signal rise rate of $\Delta C$ (725) divided by $T_s$ that is associated with the electrode 105 that resulted in detection of the contact, where $T_s$ is the period associated with the sampling frequency which is constant. For example, the period may be 9 ms. The rise rate may be determined by computing a difference in the measurement value associated with adjacent samples. For example, the sample that resulted in contact detection and the immediately prior sample may be compared. How far back in time to select a sample may be a function of the determined rise rate. For example, the sample at time $T_{-4}$ 702b may be selected for a relatively slow rise rate and the sample at time $T_{-1}$ 702e may be selected for a relatively fast rise rate. The use of rise rate is used to estimate a more likely steady state background capacitance time prior to a user approaching contact. That is, a way to recognize the presence of a touch is if during the fixed sampling time interval the signal changes rapidly enough (i.e., $\Delta C$ is sufficiently large for a given $T_s$).

In other implementations, the sample selected corresponds to the sample 735 taken at a time on the time axis where a tangent line 730, which passes through adjacent samples, intersects the time axis. The tangent line 730 is tangent to the sample at the threshold 740, or other locations (e.g., ⅔ of the contact steady state). For example, referring to FIG. 7, the tangent line 730 intersects the time axis at time $T=T_{-3}$ 702c. Therefore, the sample 735 taken at that time $T_{-3}$ may be selected. At time $T_0$, the processor determines that a touch contact has occurred sometime in the past and selects the appropriate time, such as $T_{-3}$, which may be the best time to collect the background data. Other approaches to selection may be used. The tangent line 730 may not intersect the time axis at a time exactly equal to one of the sampling times 702a-f, but rather a time in between two sampling times. In this case, one option is to select the sampling time closest to the intersection of line 730 and the time axis. Alternatively, the background levels selected in block 605 may be determined by interpolating between the stored background levels from the sampling times immediately before and after the intersection of line 730 and the time axis.

At block 610, subsequent electrode 105 measurements are adjusted by the selected samples 735. As noted above, the selected samples 735 approximate the state of the background capacitance just before contact occurred, and the background capacitance remains substantially constant after the contact has occurred. For example, the user may contact the contact layer 102 with his finger and may then drag his finger across the contact layer 102 as though to drag a displayed object. Measurements taken during the dragging are adjusted by the sample 735 selected prior to contact detection.

At first it may appear to be problematic that background estimates do not change while a finger is dragging over the touch surface and in all probability the signal backgrounds are changing. However, in most applications absolute coordinate accuracy is most needed during the initial touch down event and there after smooth continuous relative control of the cursor position is desired and absolute coordinate accuracy is relatively less important.

Different electrodes may have different amounts or levels of background capacitance. The selected sample 735 for each electrode is based on the measurement for the respective electrodes at the selected time. The time is selected using just one electrode based on the first identified contact (e.g., the electrode with the biggest touch signal, e.g. electrode 5 of FIGS. 4A and 4B). Alternatively, measurements from multiple electrodes may be summed to select the time to be used for all or a sub-set of the other electrodes.

Adjustment may correspond to subtracting values associated with the selected samples 735 from new measurements. A different function for adjusting the measurements may be used. For example, a weighting factor may be applied to augment or diminish the adjustment effect. The background value for each electrode is used to adjust the current and/or future measurements for that corresponding electrode as long as contact is maintained. In the example of FIG. 4B, the hashed portion for each electrode is subtracted from the measurement magnitude for that electrode, lowering the measurements by different amounts.

At block 615, the contact location is determined based on the adjusted values. For example, the processor 202 determines the X component of the contact location by locating a point on the X-axis (FIG. 4B) whereby the sum of the adjusted measured values above the location and below the location are equal. A similar operation may be used to determine the Y component.

At block 620, if contact is maintained, the operations repeat from block 610. Otherwise, the operations continue to block 600. For example, during a drag operation, measurements are adjusted. Once contact is lost, storing of the samples may resume at block 600 until a new contact is detected.

While various embodiments have been described, it will be apparent to those of ordinary skill in the art that many more embodiments and implementations are possible that are within the scope of the claims. For example, detection of contact may be limited to select electrodes, such as electrodes located near the center of the contact layer 102. The detection thresholds for the various electrodes may be different and may be adjusted based on a detected background capacitance. Samples taken at different times may be combined and/or averaged to determine an average background capacitance prior to contact. The samples may be filtered to reduce the effects of noise.

Accordingly, it will be apparent to those of ordinary skill in the art that many more embodiments and implementations are possible that are within the scope of the claims. Therefore, the embodiments described are only provided to aid in understanding the claims and do not necessarily limit the scope of the claims.

What is claimed:

1. A method for determining a location of contact with a touch sensitive device, the method comprising:
    sampling, on a periodic basis, a plurality of first values associated with each electrode of a plurality of electrodes of the touch sensitive device, the touch sensitive device comprising a single electrode layer device, wherein the sampling of the plurality of first values occurs during a first time period, the first time period comprising a plurality of sampling periods, a sampling period being a time difference between two consecutive samplings;
    storing a subset of the plurality of first values for a second time period, the second time period being at least twice the sampling period and comprising at least two samplings;
    determining whether a contact with the touch sensitive device has occurred, wherein the first time period ceases upon contact determination;
    sampling, subsequent to the contact, a second value associated with at least one electrode of the plurality of electrodes;
    adjusting one or more second values based on at least one of the stored subset of the plurality of first values while the contact is occurring, the at least one of the stored subset being sampled at least two sampling periods prior to the determination of the contact; and
    determining a location of the contact based on the adjusted values.

2. The method according to claim 1, further comprising determining whether a rate of change of a value associated with one or more electrodes of the plurality of electrodes exceeds a threshold.

3. The method according to claim 1, further comprising:
    determining a rate of change of a value associated with one or more electrodes of the plurality of electrodes; and
    selecting one or more of the plurality of first values based on the determined rate of change.

4. The method according to claim 1, further comprising ceasing storing of the subset after determining the contact with the touch sensitive device has occurred.

5. The method according to claim 4, continuously determining the location of contact based on the subset until contact with the touch sensitive device has ceased.

6. The method according to claim 4, further comprising:
    determining whether contact with the touch sensitive device has ceased, and resuming storing of samples after contact with the touch sensitive device has ceased.

7. The method according to claim 1, wherein the time period lasts a time limit based on one of a maximum sample count and a maximum second count.

8. The method according to claim 1, wherein the touch sensitive device comprises a transparent surface and the electrodes are arranged on the transparent surface, the touch sensitive device surface is positioned over a display surface, and the location of contact corresponds to a location where a user touches the touch sensitive device.

9. A system for determining a location of contact with a capacitive touch sensitive device, the system comprising:
    one or more analog-to-digital converters configured to sample, on a periodic basis, signals at a plurality of electrodes; and
    a processor configured to:
    store a subset of a plurality of one or more first values associated with a plurality of the sampled signals, the signals sampled during a first time period, the first time period comprising a plurality of sampling periods, a sampling period being a time difference between two consecutive samplings, the subset stored for a second time period, the second time period being at least twice the sampling period and comprising at least two samplings;
    determine whether a contact with the touch sensitive device has occurred, the sampling ceasing upon contact determination;
    select a background value for each of the electrodes of the plurality based on at least one of the stored subset of the plurality of one or more first values, the at least one of the stored subset used in the selection of the background value for each of the electrodes being sampled at least two sample periods prior to the determination of the contact;

sample, subsequent to the contact, a second value associated with at least one electrode of the plurality of electrodes;

adjust one or more second values for each of the electrodes by the respective background values while the contact is occurring, the one or more first values being sampled prior to the determination of the contact; and determine a location of the contact based on the adjusted values.

10. The system according to claim 9, wherein the processor is configured to determine whether a rate of change of a value associated with one or more electrodes of the plurality of electrodes exceeds a threshold.

11. The system according to claim 9, wherein the processor is configured to:

determine a rate of change of a value associated with one or more electrodes of the plurality of electrodes; and select one or more first values based on the determined rate of change.

12. The system according to claim 9, wherein the processor is configured to cease storage of the plurality of one or more first values after contact with the touch sensitive device has occurred.

13. The system according to claim 12, wherein the processor is configured to continuously determine the location of contact based on the plurality of one or more first values until contact with the touch sensitive device has ceased.

14. The system according to claim 12, wherein the processor is configured to: determine whether contact with the touch sensitive device has ceased, and resume storage of values after contact with the touch sensitive device has ceased.

15. The system according to claim 9, wherein the processor is configured to store a subset for a time period lasting a limited time based on one of a maximum sample count and a maximum second count.

16. The system according to claim 9, wherein the touch sensitive device comprises a transparent surface and the electrodes are arranged on the transparent surface, the touch sensitive device surface is positioned over a display surface, and the location of contact corresponds to a location where a user touches the touch sensitive device.

17. A non-transitory computer readable storage medium having stored therein data representing instructions executable by a programmed processor for determining a location of contact with a touch sensitive device, the storage medium comprising instructions for:

identifying background capacitance from prior to a contact with the touch sensitive device;

removing the background capacitance from measurements of a plurality of electrodes while the contact is occurring, the background capacitance being identified prior to the determination of the contact by sampling, on a periodic basis, a plurality of first values associated with each electrode of a plurality of electrodes of the touch sensitive device the sampling occurring during a first time period that ceases upon contact determination, the first time period comprising a plurality of sampling periods, a sampling period being a time difference between two consecutive samplings, and storing a subset of the plurality of first values associated with a plurality of the sampled signals for a second time period, the second time period being at least twice the sampling period and comprising at least two samplings, at least one of the stored subset used in the identification of the background capacitance being sampled at least two sample periods prior to the determination of the contact; and determining a location of the contact based on the measurements with the background capacitance removed.

18. The non-transitory computer readable storage medium according to claim 17, wherein identifying comprises:

determining a rate of change of values associated with one or more electrodes of the plurality of electrodes; and selecting the background capacitance based on the determined rate of change.

19. The non-transitory computer readable storage medium according to claim 17, further comprising:

storing values sampled prior to the contact, the background capacitance based on the stored values; and ceasing storing of the values after contact with the touch sensitive device has occurred.

20. The non-transitory computer readable storage medium according to claim 19, wherein the location of contact is continuously determined based on the removing of the background capacitance until contact with the touch sensitive device has ceased.

* * * * *